United States Patent [19]

Kokubu

[11] Patent Number: 4,833,540
[45] Date of Patent: May 23, 1989

[54] IMAGE PROCESSING APPARATUS

[75] Inventor: Sadao Kokubu, Aichi, Japan

[73] Assignee: Kabushiki Kaisha Tokai Rika Denki Seisakusho, Aichi, Japan

[21] Appl. No.: 68,525

[22] Filed: Jul. 1, 1987

[30] Foreign Application Priority Data

Jul. 4, 1986 [JP] Japan ................................ 61-157738

[51] Int. Cl.$^4$ ............................................ H04N 5/225
[52] U.S. Cl. ...................................... 358/225; 358/228
[58] Field of Search ................................ 358/225, 228

[56] References Cited

U.S. PATENT DOCUMENTS

| 4,589,030 | 5/1986 | Kley | 358/225 |
| 4,601,537 | 7/1986 | Saccocio | 358/225 |
| 4,603,356 | 7/1986 | Bates | 358/225 |

FOREIGN PATENT DOCUMENTS 0134578 8/1983 Japan .................................... 358/225

*Primary Examiner*—Russell E. Adams
*Attorney, Agent, or Firm*—Finnegan, Henderson, Farabow, Garrett & Dunner

[57] ABSTRACT

An image processing apparatus which includes a light reception surface for generating a light reception signal from between a pair of electrodes when in a light receiving condition. Shutter means are provided which have numbers of shutter elements linearly or two-dimensionally arranged so as to correspond to the light reception element and so that an image is projected on front surfaces of the shutter elements. Scanning means are arranged to generate a scanning signal at a predetermined timing so as to successively cause the shutter elements to open in response to the scanning signal. Image encoding means process the light reception signal from the light reception element in the series in synchronism with the scanning signal to generate a coded signal which corresponds to the image projected on the shutter means.

6 Claims, 4 Drawing Sheets

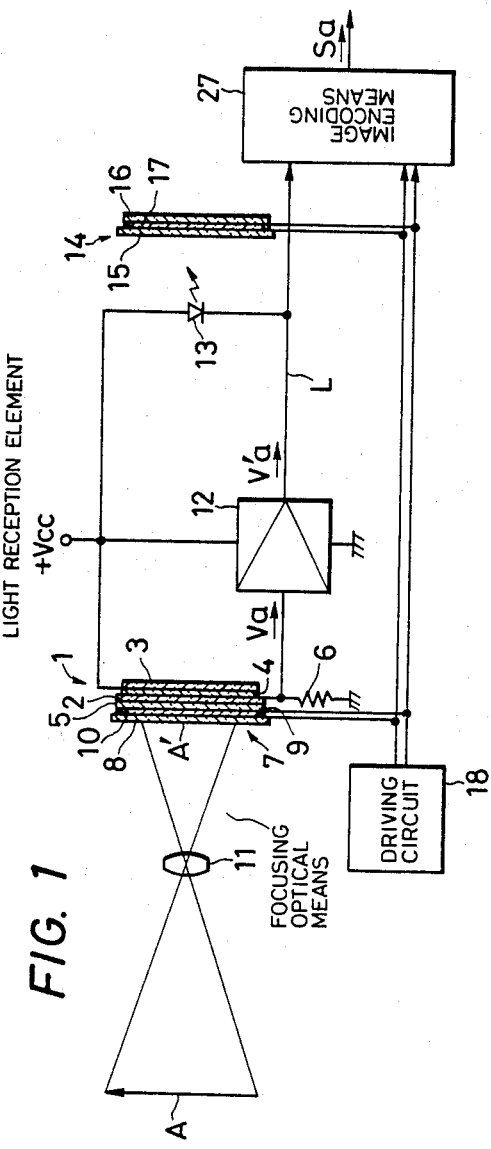
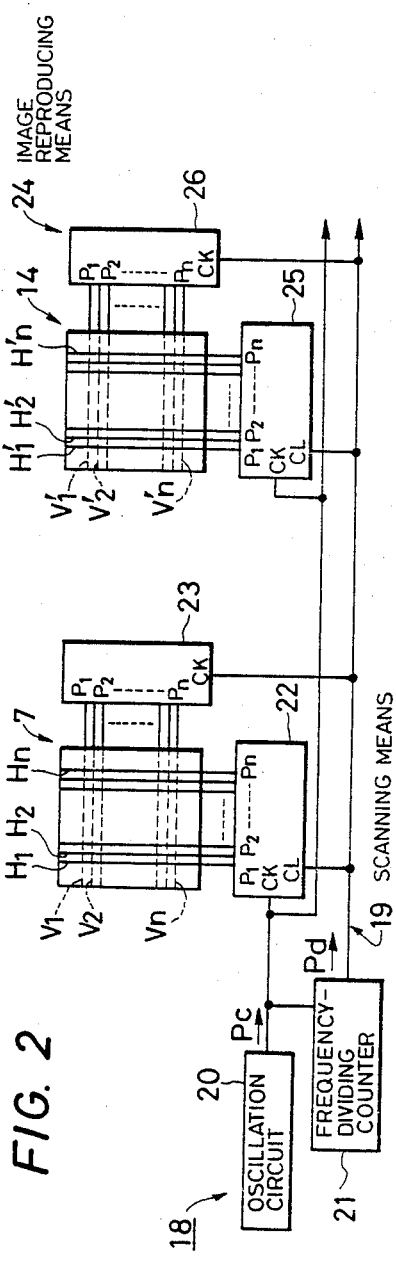
FIG. 1
FIG. 2

IMAGE PROCESSING APPARATUS

BACKGROUND OF THE INVENTION

1. Field of the Invention

The present invention generally relates an image processing apparatus and particularly relates to an image processing apparatus provided with a function for converting an image into an electric signal.

2. Description of the Prior Art

Image processing apparatuses for converting an image into a corresponding electric signal conventionally include an image pickup tube having a solid state image pickup element such as a so-called charge coupled device (CCD) image sensor, and the like.

Such image pickup tubes, solid state image pickup elements, and the like, however, have the distinct disadvantage of being expensive. In addition, when an output of the device (that is, an electric signal corresponding to an image) is to be coded for input into a microcomputer, it is necessary to provide a very complicated peripheral arrangement for performing the coding. There has been a further problem that when a picture image is reproduced in real time corresponding to an output electric signal, it is necessary to provide an image reproducing apparatus including a complicated display such as a CRT or the like and a reproducing circuit resulting in an arrangement for the reproduction which is very complicated.

It is therefore an object of the present invention to overcome these and other disadvantages in the prior art.

It is another object of the present invention to provide an image processing apparatus in which an arrangement for converting an image into an electric signal which is produced as an output signal can be realized simply and inexpensively, and in which the output signal can be easily coded.

It is a further object of the present invention to provide an image processing apparatus in which an arrangement for converting an image into an electric signal which is produced as an output signal can be realized simply and inexpensively, and in which an arrangement for reproducing the image in real time corresponding to the output signal can be simplified.

SUMMARY OF THE INVENTION

In order to attain the above and other objects, according to one aspect of the present invention, the image processing apparatus includes a light reception element which has a light reception surface and generates a light reception signal from between a pair of electrodes upon receiving light. Shutter means are provided having a number of shutter elements linearly or two-dimensionally arranged so as to correspond to the light reception surface of the light reception element and so that an image is projected on front surfaces of the shutter elements. Scanning means are arranged to generate a scanning signal at predetermined timing so as to successively cause the numbers of shutter elements to open in response to the scanning signal. An image encoding means processes the light reception signal from the light reception element in time series in synchronism with the scanning signal to generate a coded signal corresponding to the image projected on the shutter means.

According to another aspect of the present invention, the image processing apparatus provides a light reception element having a light reception surface and for generating a light reception signal from between a pair of electrodes in a condition of receiving light. Shutter means are also provided which have numbers of shutter elements linearly or two-dimensionally arranged so as to correspond to the light reception surface of the light reception element and so that an image is projected on the front surfaces of the shutter element. Scanning means are arranged to generate a scanning signal at predetermined timing to cause the numbers of shutter elements to open successively in response to the scanning signal. A luminous element is included for emitting light in synchronism with the light reception signal from the light reception element. An auxiliary shutter means is constituted by a number of auxiliary shutter elements arranged in the same manner as the shutter elements of the shutter means. Image reproducing means are also provided for causing the auxiliary shutter elements of the auxiliary shutter means to open in response to the scanning signal in synchronism with the shutter elements to selectively pass the light from the luminous element to reproduce the image.

In the image processing apparatus, an image is projected onto the shutter means and the shutter elements of the shutter means are successively opened in response to the scanning signal. If any one of the shutter elements located at a position where the image is actually projected is opened, the light reception element is put into a light reception state so as to generate the light reception signal. Accordingly, the shape of the image can be specified on the basis of the timing of the respective outputs of the scanning signal and the light reception signal. In the image processing apparatus according to the first aspect of the present invention provided with the image encoding means, the light reception signal is processed in time series in synchronism with the scanning signal to generate a coded signal corresponding to the image focused on the shutter means.

In the image processing apparatus according to the second aspect of the present invention provided with the luminous element, the auxiliary shutter means, and the image reproducing means, the luminous element emits light every time the light reception signal is produced from the light reception element and the auxiliary shutter elements of the auxiliary shutter means arranged in the same manner as those of the shutter means are opened in synchronism with the shutter elements of the shutter means, so that the light from the luminous element is passed successively through the auxiliary shutter elements corresponding to the image. Accordingly, by making the output frequency of the scanning signal high, the image can be reproduced by the auxiliary shutter means.

BRIEF DESCRIPTION OF THE DRAWINGS

The manner by the above objects and other objects, features and advantages of the present invention are attained will be fully apparent from the following description in conjunction with the accompanying drawings, in which:

FIG. 1 is a schematic diagram of an image processing apparatus in accordance with the present invention;

FIG. 2 is a schematic diagram of the electrical arrangement of the apparatus shown in FIG. 1;

DESCRIPTION OF THE PREFERRED EMBODIMENTS

Figure 3:
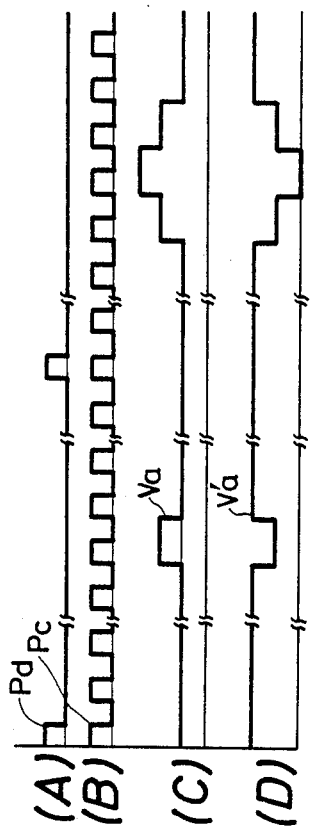
FIG. 3 is a time chart illustrating the operation of the apparatus of FIG. 1.

FIGS. 1 through 3 illustrate a first embodiment of the present invention. In FIG. 1, a light reception element 1 is arranged in such a manner that a thin film of $CdS_4$ is sandwiched between a pair of plane electrodes 2 and 3. The one electrode 2 is transparent so that the whole surface of the one electrode 2 can act as a plane light reception surface 5. In such a light reception element 1, the electrode 2 is connected to the earth terminal through a resistor 6, and the other electrode 3 is connected to the positive terminal, +Vcc, of a power source, so that a light reception signal, Va, is produced when the light reception element 1 is put into a light reception state through the light reception surface 5. The voltage level of the light reception signal Va increases as the resistance value betwen the electrodes 2 and 3 is lowered with the increase of the amount of light reception of the light reception element 1.

A first liquid crystal array 7 acting as the shutter means is a so-called active matrix type liquid crystal shutter in which a plurality of liquid crystal picture elements (not shown), acting as the shutter elements, are two-dimensionally arranged in a matrix. Switching transistors are provided for driving the respective liquid crystal picture elements. Referring to FIG. 2, the first liquid crystal array 7 is arranged in such a manner that a liquid crystal 10 is sealed between transparent substrates 8 and 9, and linear transparent electrodes V1–Vn (n being a natural number), extending in the horizontal direction (X-direction), are disposed parallel to each other on the substrate 8 and n linear transparent electrodes H1–Hn extending in the vertical direction (Y-direction) are disposed parallel to each other on the substrate 9. The above-mentioned picture elements are formed at the points of intersection of the transparent electrodes V1–Vn and H1–Hn. When any selected one of the transparent electrodes V1–Vn and any selected one of the transparent electrodes H1–Hn are simultaneously supplied with a high level signal, the picture element at the point of intersection of the selected transparent electrodes is converted into an open state where light is passed through the picture element.

A focusing optical system 11 is arranged in front of the first liquid crystal array 7 and projects an image A to be processed onto the first liquid crystal array 7 as an image A'. An amplifier 12 is arranged to inverse-amplify the voltage signal Va from the light reception element 1 to produce an amplified voltage signal Va' onto an output line L. A luminous element 13 is connected between the positive terminal, +Vcc, of the power source and the output line L so that the luminous element 13 is energized by the voltage signal Va' to emit light that is projected on a second liquid crystal array 14 acting as the auxiliary shutter means.

The second liquid crystal array 14 is constituted as an active matrix type liquid crystal shutter in which a plurality of liquid crystal picture elements (not shown) acting as the auxiliary shutter elements are arranged in the same manner as the liquid crystal picture elements of the first liquid crystal array 7. Specifically, the second liquid crystal array 14 is arranged in such a manner that a liquid crystal 17 is sealed between transparent electrodes 15 and 16, and n linear transparent electrodes V'1–V'n extending in the horizontal direction (X-direction) are disposed parallel to each other on the one electrode 15 and n linear transparent electrodes H'1–H'n extending in the vertical direction (Y direction) are disposed parallel to each other on the other electrode 16 (see FIG. 2), so that the above-mentioned picture elements are formed at the points of intersection of the transparent electrodes V'1–V'n and H'1–H'n. When any selected one of the transparent electrodes H'1–H'n are simultaneously supplied with a high level signal, the picture element at the point of intersection of the selected transparent electrodes is changed over into an open state to permit light to pass through the picture element.

A driving circuit 18 is provided for driving the first liquid crystal array 7 and the second liquid crystal array 14. The driving circuit 18 will be described with reference to FIG. 2. In FIG. 2, a scanning means 19 is constituted by an oscillation circuit 20, a frequency-dividing counter 21, and shift registers 22 and 23. The oscillation circuit 20 is arranged to generate a relatively high-frequency clock pulse Pc acting as a scanning signal. The frequency-dividing counter 21 is arranged so as to be supplied with the clock pulse Pc at its clock terminal CK and produces one frequency-division pulse Pd acting as a scanning signal every time the number of the clock pulses Pc supplied to the frequency-dividing counter 21 reaches n (corresponding to each of the number of the transparent electrodes V1–Vn of the first liquid crystal array 7 and the number of the transparent electrodes V'1–V'n of the second liquid crystal array 14). The frequency-division pulse Pd is used as a pulse for synchronizing the respective operations of the shift registers 22 and 23. Each of the shift registers 22 and 23 is of the serial-input, serial-output type. The shift register 22 is arranged to be supplied with the clock pulse Pc at its clock terminal CK and with the frequency-division pulse Pd at its clear terminal CL. The shift register 23 is arranged to be supplied with the frequency-division pulse Pd at its clock terminal CK.

The shift register 22 has n output terminals P1–Pn respectively connected to the transparent electrodes H1–Hn of the first liquid crystal array 7 so that upon reception of the frequency-division pulse Pd at the clear terminal CL the shift register 22 produces a high level signal at only the output terminal P1 and produces a low level signal at each of the remaining output terminals P2–Pn. Thereafter, every time the clock pulse Pc is supplied to the clock terminal CK the shift register 22 is shifted such that a high level signal is produced at only one successive output terminal. The shift register 23 has n output terminals P1–Pn respectively connected to the transparent electrodes V1–Vn of the first liquid crystal array 7 so that every time the shift register 23 recieves the frequency-division pulse Pd at its clock terminal CK the shift register 23 produces a high level signal at only one of the successive output terminals P1–Pn. Accordingly, in the scanning means 19, scanning is performed so that the liquid crystal picture elements are successively converted to the open state (the state in which light is allowed to pass) beginning with the liquid crystal picture element corresponding to the point of intersection of the transparent electrodes H1 and V1 of the first liquid crystal array 7 to the liquid crystal picture element corresponding to the point of intersection of the transparent electrodes Hn and Vn of the first liquid crystal array 7.

An image reproducing means 24 forming a part of the driving circuit 18 is constituted by shift registers 25 and 26 which are arranged in the same manner as the shift registers 22 and 23 respectively. That is, the shift register 25 is arranged to be supplied with the clock pulse Pc at its clock terminal CK and with the frequency-division pulse Pd at its clear terminal CL, and the shift register 26 is arranged to be supplied with the frequency-division pulse Pd at its clock terminal CK. The shift register 25 has n output terminals P1–Pn respectively connected to the transparent electrodes H'1–H'n of the second liquid crystal array 14 and is shifted in the same manner as the shift register 22. The shift register 26 has n output terminals P1–Pn respectively connected to the tranparent electrodes V'1–V'n of the second liquid crystal array 14 and is shifted in the same manner as the shift register 23. Accordingly, in the image reproducing means 24, scanning is performed so that the liquid crystal picture elements are successively converted to the open state (the state in which light is allowed to pass) from the liquid crystal picture element corresponding to the point of intersection of the transparent electrodes H'1 and V'1 of the second liquid crystal array 14 to the liquid crystal picture element corresponding to the point of intersection of the transparent electrodes H'n and V'n of the second liquid crystal array 14 in synchronism with the respective liquid crystal picture elements of the first liquid crystal array 7.

Returning now to FIG. 1, an image encoding means 27 can be seen which comprises an A–D conversion circuit for converting an analog voltage signal V'a from the amplifier 12 into a digital signal and is arranged so as to process the voltage signal V'a in time series in synchronism with the clock pulse Pc and the frequency-division pulse Pd to produce a coded signal Sa that corresponds to a focused image A' on the first liquid crystal array 7 as will be understood from the description which follows.

Referring to the time charts A–B of FIG. 3, the operation of the apparatus shown in FIGS. 1 and 2 will be described. As shown in time charts A and B of FIG. 3, a relatively high frequency clock signal Pc is generated from the oscillation circuit 20 and a frequency-division pulse Pd obtained by frequency-dividing the clock signal Pc is produced from the frequency-dividing counter 21. In response to the clock signal Pc and frequency-division pulse Pd, the scanning means 19 and image reproducing means 24 scan the first liquid crystal array 7 and second liquid crystal array 14, respectively, so that the liquid crystal picture elements of the respective first and second liquid crystal arrays 7 and 14 are converted in synchronism with each other so as to be successively put in the open state. Every time any one of the liquid crystal picture elements at a part corresponding to the image A' projected on the first liquid crystal array 7 is open, the light of the image A' is allowed to pass through the open liquid crystal picture element so that the light reception element 1 is put into the light reception state to produce the voltage signal Va, as shown in time chart C of FIG. 3. Upon reception of the voltage signal Va, the amplifier 12 produces the voltage signal V'a, as shown in time chart D of FIG. 3, which is in turn applied to the image encoding means 27. The image encoding means 27 processes the voltage signal V'a in time series in synchronism with the clock signal Pc and the frequency-division pulse Pd to produce the coded signal Sa. In this case, a liquid crystal picture element in the open state can be specified on the basis of the output timing of the clock signal Pc and the frequency-division pulse Pd and a judgement as to whether the image A' is being projected on a liquid crystal picture element at any position can be made on the basis of the existence of the voltage signal V'a. As a result, the shape of the image A' can be specified on the basis of the output timing of the clock signal Pc, the frequency-division pulse Pd, and the voltage signal V'a. Accordingly, the coded signal Sa from the image encoding means 27 corresponds to the image A' and such a coded signal Sa is fed into, for example, a microcomputer (not shown) and used for various kinds of processing and control functions.

On the other hand, every time the voltage signal V'a is produced from the amplifier 12, the luminous element 13 is actuated to emit light that is projected onto the second liquid crystal array 14. In that case, the respective liquid crystal picture elements of the second liquid crystal array 14 are successively converted to the open state in synchronism with the respective liquid crystal picture elements of the first liquid crystal array 7, and the luminous element 13 is actuated to emit light every time any of the liquid crystal picture elements of the second liquid crystal array 14 located in the position corresponding to the image A' is put into an opened state. As a result, the light emitted from the luminous element 13 is allowed to pass successively through the successively, selectively open liquid crystal picture elements located at the positions corresponding to the image A'. Accordingly, if the scanning frequency of each of the first liquid crystal array 7 and the second liquid crystal array 14 is made high to an extent of about 16 times per sec or more, it is possible to reproduce the image A' in real time on the second liquid crystal array 14.

In the foregoing embodiment, according to the present invention, the means for converting the image A' into an electric signal are provided by the first liquid crystal array 7, the light reception element 1, and the scanning means 19. Accordingly, the whole arrangement can be simplified in comparison with the conventional arrangement in which an image pickup tube, a solid state image pickup element, or the like is used. Further, since it is obtained as a time series signal based upon the clock pulse Pc, the frequency-division pulse Pd, and the voltage signal V'a, the electric signal corresponding to the image A' can be easily coded. The resulting arrangement of the image encoding means 27 for encoding the electric signal is less complicated as the conventional case. Further, the means for reproducing the image A' in real time is provided by the second liquid crystal array 14 and the image reproducing means 24 for driving the second liquid crystal array 14. The arrangement of the reproducing means, therefore, is not as complicated as the conventional arrangement which requires a complicated device such as a CRT and a reproducing circuit.

Figure 4:
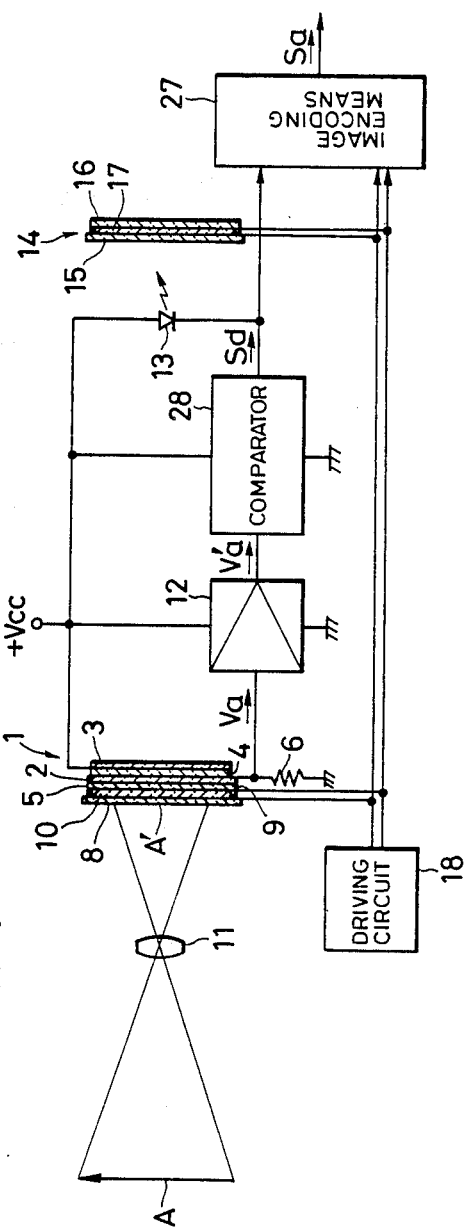
FIG. 4 is a schematic diagram showing another image processing apparatus in accordance with the present invention.
Figure 5:
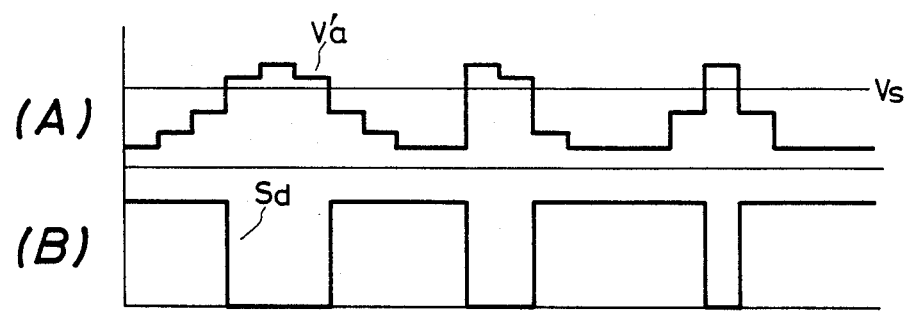
FIG. 5 is a schematic diagram of the electrical arrangement of the apparatus shown in FIG. 4.

FIGS. 4 and 5 show a second embodiment of the present invention. In the second embodiment, the parts the same as, or equivalent to, those in the first embodiment are referenced correspondingly.

A comparator circuit 28 is provided for binary coding of the voltage signal V'a from the amplifier 12, and the luminous element 13 is actuated to emit light by the output of the comparator circuit 28. The comparator circuit 28 sets the voltage signal V'a shown in time chart A of FIG. 5 to one of two values with respect to the level of a threshold voltage Vs to produce the binary coded signal Sd. Accordingly, the same effect as that of the first embodiment can be obtained by the second embodiment, and particularly, in the second embodiment, the A–D conversion circuit in the image encoding means 27 can be eliminated to further simplify the circuit arrangement.

Figure 6:
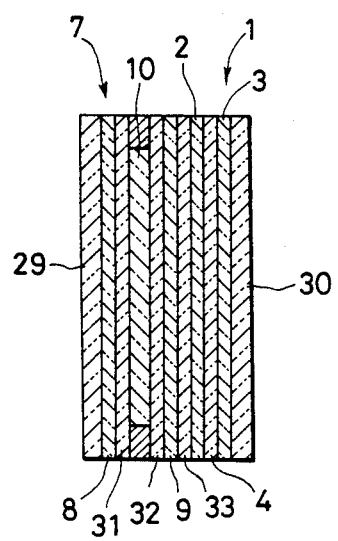
FIG. 6 is a longitudinal sectional view of a light reception element and liquid crystal array in accordance with the present invention.

FIG. 6 illustrates a light reception element 1 and liquid crystal array 7 in accordance with the present invention. The parts the same as, or equivalent to, those in the first embodiment are referenced correspondingly. The light reception element 1 and the first liquid crystal array 7 are integrally provided between a pair of glass substrates 29 and 30. In FIG. 6, each of the reference numerals 31, 32 and 33 designates an insulating film. It is thus possible to shorten the distance between the light reception element 1 and the first liquid crystal array 7 to improve the speed of response and to realize a simplification of the structure.

Figure 7:
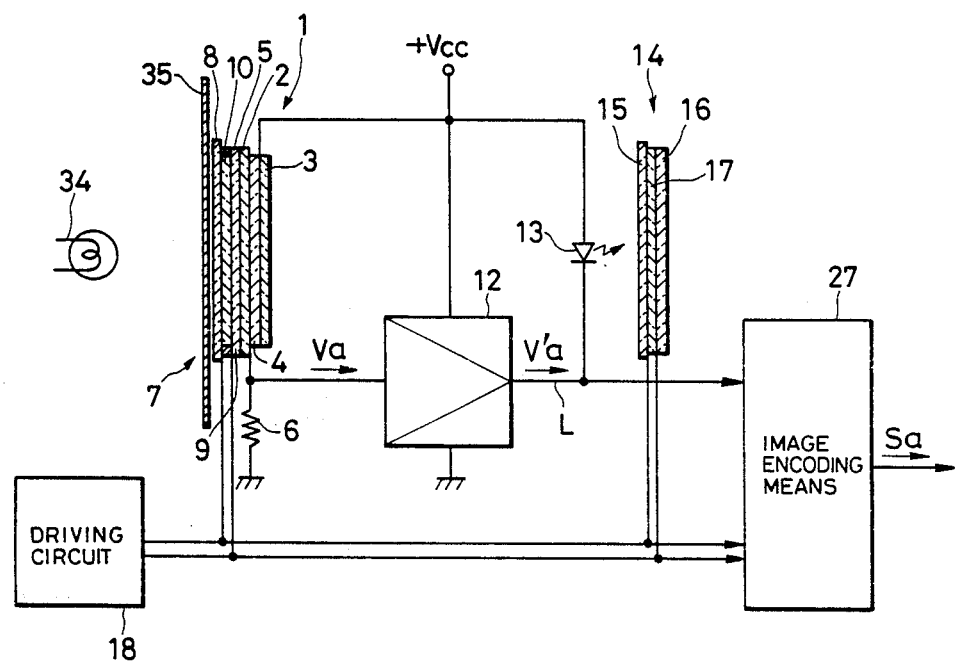
FIG. 7 is a schematic diagram of an image processing apparatus in accordance with the present invention.

FIG. 7 illustrates a third embodiment of the present invention. The parts the same as, or equivalent to, those in the first embodiment are referenced correspondingly. A lamp 34 and a image plate 35, having a predetermined shape, are provided in place of the optical system 11 of the first embodiment. In this case, in the image plate 35, only the portion having the predetermined shape composed of pictures, characters, symbols, etc., and disposed along the front face of the first liquid crystal array 7, has a light projecting property so that an image corresponding to the foregoing shape is projected on the front face of the first liquid crystal array 7 in the lighting state of the lamp 34. The purpose is to provide an image processing apparatus in which images may not be formed by the use of an optical system. The form of the invention shown in FIG. 7 provides for direct use of the image plate 35, such as a film-like plate or image transferred material.

In each of the foregoing embodiments, there is provided the first liquid crystal array 7 and the second liquid crystal array 14 each having a two-dimensional array of liquid crystal picture elements. However, depending on the kind of the image to be processed, each of the first liquid crytsal array 7 and the second liquid crystal array 14 may be a liquid crystal array of linearly arranged liquid crystal picture elements.

As is apparent from the foregoing description, the image processing apparatus according to the present invention has superior effects in that the arrangement for converting an image into an electric signal which is produced as an output, can be simplified to reduce the cost, in that the output signal can be easily encoded, and in that the arrangement for reproducing the image corresponding to the output signal in real time can be simplified.

What is claimed is:

1. An image processing apparatus for processing an image comprising:
    a light reception element including a light reception surface for generating a light reception signal in response to light being incident thereon;
    shutter means having a plurality of shutter elements disposed between the image and said light reception element;
    scanning means arranged to generate a scanning signal at predetermined timing so as to successively cause said shutter elements to open in response to said scanning signal to enable light to pass therethrough;
    a luminance element for emitting light in synchronism with said light reception signal from said light reception element;
    an auxiliary shutter means constituted by a plurality of auxiliary shutter elements arranged correspondingly to said shutter elements of said shutter means; and
    an image reproducing means for causing said auxiliary shutter elements of said auxiliary shutter means to open to response to said scanning signal in synchronism with said shutter elements to selectively pass the light from said luminous element to thereby reproduce said image.

2. An image processing apparatus according to claim 1, in which said shutter elements comprise a first liquid crystal array of a plurality of liquid crystal picture elements, and said auxiliary shutter elements comprise a second liquid crystal array of liquid crystal picture elements.

3. An image processing apparatus according to claim 1 wherein said plurality of shutter elements is arranged in a linear array.

4. An image processing apparatus according to claim 1, wherin said plurality of shutter elements is arranged in a two-dimensional matrix.

5. An image processing apparatus according to claim 1 further including image encoding means for processing said light reception signal from said light reception element in time series and in synchronism with said scanning signal to generate a coded signal corresponding to said image projected on said shutter means.

6. An image processing apparatus according to claim 5 further including a comparator for producing a binary coded signal in response to said light reception signal.

* * * * *